United States Patent
Barauna

(10) Patent No.: US 9,270,192 B2
(45) Date of Patent: Feb. 23, 2016

(54) VARIABLE SPEED DRIVE PROVIDED WITH A SUPERCAPACITOR MODULE

(75) Inventor: Allan Pierre Barauna, Vernon (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 502 days.

(21) Appl. No.: 13/879,536

(22) PCT Filed: Oct. 21, 2011

(86) PCT No.: PCT/EP2011/068452
§ 371 (c)(1),
(2), (4) Date: Apr. 15, 2013

(87) PCT Pub. No.: WO2012/065806
PCT Pub. Date: May 24, 2012

(65) Prior Publication Data
US 2013/0201732 A1 Aug. 8, 2013

(30) Foreign Application Priority Data

Nov. 15, 2010 (FR) .................................... 10 59357

(51) Int. Cl.
*H02P 3/14* (2006.01)
*H02M 5/458* (2006.01)
(Continued)

(52) U.S. Cl.
CPC .............. *H02M 5/458* (2013.01); *H02M 7/003* (2013.01); *H02M 7/797* (2013.01); *H02P 27/06* (2013.01); *H02M 2001/007* (2013.01)

(58) Field of Classification Search
CPC ..... H02M 5/458; H02M 7/003; H02M 7/797; H02M 2001/007; H02P 27/06
USPC ................ 318/362, 371, 375, 376, 798–801; 363/34, 39, 40, 41, 50; 187/290, 293; 307/64, 66, 67, 68
See application file for complete search history.

(56) References Cited

U.S. PATENT DOCUMENTS 5,285,029 A * 2/1994 Araki ...................... B66B 5/027
187/290
5,631,813 A * 5/1997 Ikeshita .............. H02M 5/4585
318/377

(Continued)

FOREIGN PATENT DOCUMENTS

WO 2007 044000 4/2007

OTHER PUBLICATIONS

"Shared DC Bus Configuration (Piggy Back)-with Braking Chopper," pp. 7-1 to 7-4, (Dec. 1, 2009) XP 002656491.

(Continued)

*Primary Examiner* — Anthony Salata
(74) *Attorney, Agent, or Firm* — Oblon, McClelland, Maier & Neustadt, L.L.P.

(57) ABSTRACT

A variable-speed drive including: a DC power supply bus including a positive line and a negative line; a bus capacitor connected between the positive line and the negative line of the DC power supply bus; an inverter module supplied with power by the DC power supply bus and controlled to provide a variable voltage to an electrical load; a first switching branch connected between the positive line and the negative line of the bus and including at least one first electronic switch; and a first module including a braking resistor, or a second module including a mechanism for storing and regenerating electrical energy generated during braking of the electrical load, wherein the first module and the second module are removable and interchangeable.

8 Claims, 1 Drawing Sheet

(51) Int. Cl.
*H02M 7/00* (2006.01)
*H02M 7/797* (2006.01)
*H02P 27/06* (2006.01)
*H02M 1/00* (2007.01)

(56) References Cited

U.S. PATENT DOCUMENTS

| | | | | |
|---|---|---|---|---|
| 6,938,733 | B2* | 9/2005 | Eilinger | B66B 5/027 |
| | | | | 187/290 |
| 7,915,853 | B2* | 3/2011 | Ting | H02P 3/18 |
| | | | | 318/376 |
| 8,207,631 | B2* | 6/2012 | Jahkonhen | H02M 5/4585 |
| | | | | 307/64 |
| 8,288,974 | B2* | 10/2012 | Aoki | H02P 7/281 |
| | | | | 318/375 |
| 2004/0035646 | A1* | 2/2004 | Araki | B66B 5/027 |
| | | | | 187/290 |
| 2009/0218175 | A1 | 9/2009 | Wesson et al. | |
| 2013/0016540 | A1 | 1/2013 | Barauna | |
| 2013/0234675 | A1* | 9/2013 | King | H02J 7/022 |
| | | | | 320/163 |
| 2013/0328539 | A1* | 12/2013 | King | H02J 1/102 |
| | | | | 323/299 |
| 2015/0002056 | A1* | 1/2015 | Young | B60L 11/08 |
| | | | | 318/376 |

OTHER PUBLICATIONS

"Super Capacitor Module (SCM)," Total 2 Pages, (Apr. 9, 2010) XP 002656492.

"ABB Low Voltage Drives Powerohm Resistors Inc. Price List," ABB, pp. 1-26, (Jan. 15, 2010) XP 002656493.

International Search Report Issued Nov. 10, 2011 in PCT/EP11/068452 Filed Oct. 21, 2011.

International Preliminary Report on Patentability and Written Opinion issued May 21, 2013 in PCT/EP2011/068452.

* cited by examiner

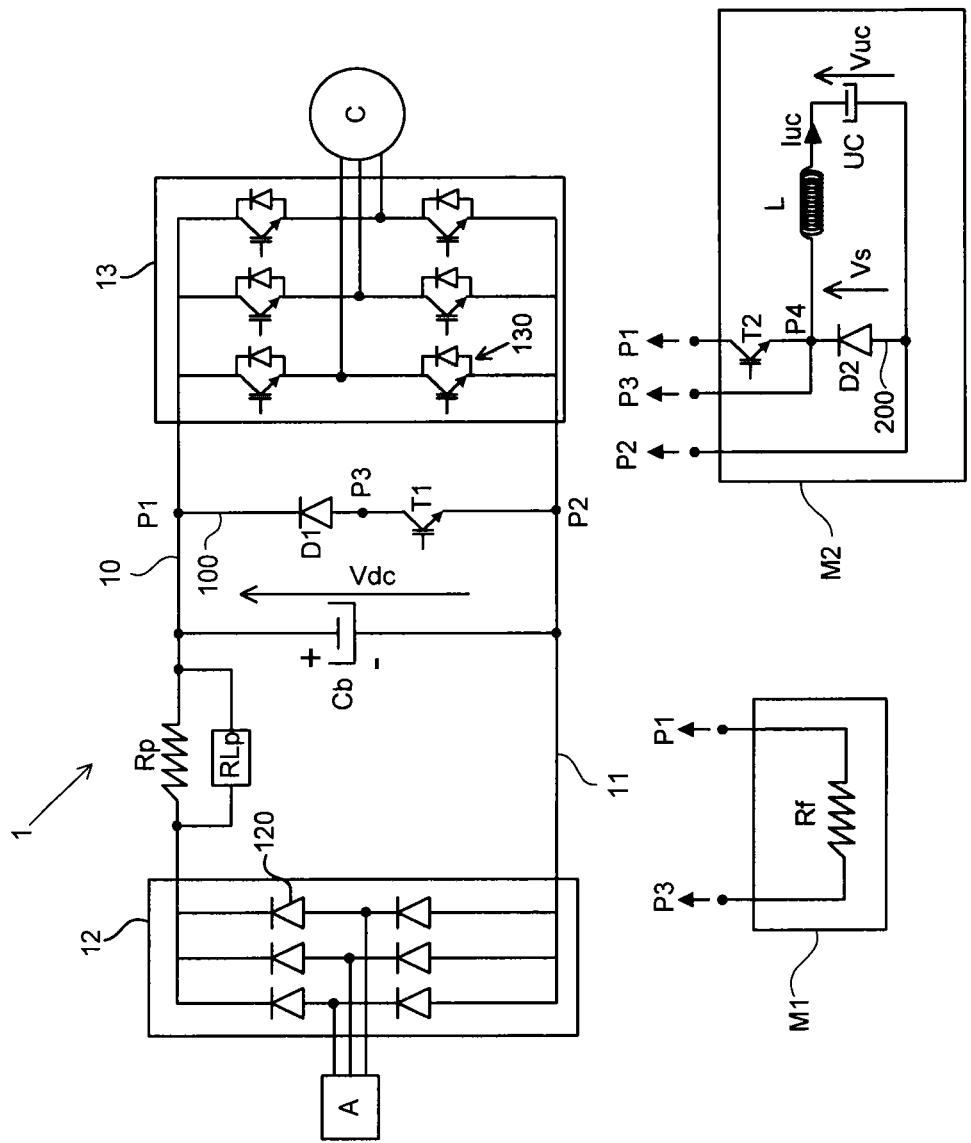

VARIABLE SPEED DRIVE PROVIDED WITH A SUPERCAPACITOR MODULE

The present invention relates to a variable-speed drive comprising means for storing and regenerating the electrical energy generated during a braking of the electrical load. These storage and regeneration means comprise, for example, one or more supercapacitors, also called ultracapacitors.

As is known, a variable-speed drive is connected to the electrical power supply network and intended to control an electrical load. It comprises, at the input, a voltage rectifier module which generates a DC voltage from an AC voltage supplied by the network and which downstream powers a DC power supply bus provided with a positive line and a negative line. A filtering capacitor, commonly called bus capacitor, is mounted between a positive line and a negative line of the DC bus. At the output, the variable-speed drive comprises an inverter module powered by the DC bus that makes it possible to generate, from the DC voltage, a variable voltage which can be of variable amplitude and frequency by using electronic switches, for example of IGBT transistor type, controlled by pulse width modulation (PWM).

The document U.S. Pat. No. 6,742,630 discloses a device installed in a variable-speed drive to recover the braking energy of installations of elevator or lifting type. This type of device consists of an energy storage unit formed by supercapacitors and an energy regulator capable of adjusting the flow of energy between the different voltage levels of the DC bus and of the storage unit, and of charging the storage unit from the surplus energy. When the energy demand of the load is high, the supercapacitors are discharged into the DC bus.

Moreover, the patent EP2131483 discloses a variable-speed drive connected to an electrical load, comprising means for storing and regenerating the electrical energy generated during the braking of the load, these storage means comprising one or more supercapacitors. In this variable-speed drive, a DC/DC converter is thus controlled to generate the charging and the discharging of the supercapacitor. The DC/DC converter is connected upstream and in parallel with the bus capacitor and also makes it possible to control the current circulating on the bus and therefore limit the THDi (total harmonic distortion of current) at the input of the variable-speed drive.

These variable-speed drives of the prior art are configured once and for all during manufacture and necessarily include the function of storing and regenerating electrical energy on the DC power supply bus. However, it is perfectly possible that a user may not desire this function and employ only a simple braking resistor intended to dissipate the energy generated during the braking of the load.

The aim of the invention is to propose a variable-speed drive in which the user can choose whether he or she wants a braking resistor or an energy storage and regeneration function, without adding extra cost to the product.

This aim is achieved by a variable-speed drive comprising:
- a DC power supply bus provided with a positive line and a negative line,
- a bus capacitor connected between the positive line and the negative line of the DC power supply bus,
- an inverter module powered by the DC power supply bus and controlled to deliver a variable voltage to an electrical load (C),
- a first switching leg connected between the positive line and the negative line of the bus and comprising at least one first electronic switch, said variable-speed drive also comprising:
- a first module comprising a braking resistor or a second module comprising means for storing and regenerating the electrical energy generated during the braking of the electrical load,
- the first module and the second module being removable and interchangeable,
- the first module and the second module taking the form of a cassette that connects on the one hand to the DC power supply bus and on the other hand to the first switching leg.

According to a particular feature, the first switching leg comprises a diode mounted in series with the first electronic switch and defining between them a connection mid-point.

According to another particular feature, the second module comprises a second switching leg and one or more supercapacitors.

According to another particular feature, the second switching leg is connected in parallel with the first switching leg.

According to another particular feature, the second switching leg comprises a second electronic switch and a diode connected in series and defining a connection mid-point connected to the connection mid-point of the first switching leg, said diode of the second switching leg being connected in antiparallel with the first electronic switch and the diode of the first switching leg being connected in antiparallel with the second electronic switch.

According to another particular feature, the second module comprises an inductor connected in series with the supercapacitor.

According to another particular feature, the braking resistor of the first module is connected in parallel with the diode of the first switching leg.

According to another particular feature, the variable-speed drive comprises control means arranged to operate differently depending on whether the first module or the second module is connected.

Other features and advantages will emerge from the following detailed description by referring to an embodiment given as an example and represented by the appended FIG. 1 schematically representing a variable-speed drive according to the invention.

Referring to FIG. 1, a variable-speed drive 1 comprises, at the input, a rectifier module 12 which is intended to rectify an AC voltage, for example 3-phase, originating from an external power supply network A (for example a 380 Vac three-phase electrical network). This rectifier module 12 advantageously uses diodes 120 which are more economical and more reliable than thyristors. This rectified voltage can be filtered to obtain a DC voltage Vdc (for example of the order of 200 to 800 Vdc or more, depending on the conditions of use) applied to a DC power supply bus consisting of a positive line 10 and a negative line 11. A bus capacitor Cb is normally used to keep the voltage Vdc of the DC bus constant. This bus capacitor Cb is connected between the positive line 10 and the negative line 11 of the bus and, in the standard variable-speed drives, it is generally of electrolytic type.

The variable-speed drive 1 comprises, at the output, an inverter module 13 making it possible, from the DC bus, to control an electrical load C with a variable voltage which can be of variable amplitude and frequency. For this, the inverter module 13 uses a control by pulse width modulation (PWM) to control power electronic switches 130 mounted on each phase. These switches are power transistors, for example of IGBT type, controlled by a control unit (not represented) producing the PWM. In FIG. 1, the inverter module 13 comprises three legs to deliver a three-phase variable voltage to the electrical load C, each leg being provided with two power transistors 130 in series between a positive terminal and a negative terminal of the power bus, or a total of six power transistors.

As a general rule, a variable-speed drive with non-reversible rectifier also comprises a precharging circuit consisting of a precharging resistor Rp and a precharging relay Rlp connected to the positive line 10 of the DC power supply bus or directly in series with the bus capacitor Cb.

Moreover, a variable-speed drive 1 may comprise a braking resistor Rf intended to dissipate the energy generated during the braking of the electrical load or means for storing and regenerating the electrical energy generated during the braking of the electrical load C. The electrical energy storage and regeneration means can also comprise one or more capacitors, more particularly of supercapacitor UC type (also called ultracapacitors). A supercapacitor UC behaves like an electrochemical battery in that it is capable of storing a greater volume of electrical energy than a standard capacitor, but, unlike an electrochemical battery, it behaves like a standard capacitor in that it is capable of supporting strong charge and discharge currents.

The using of a braking resistor Rf or of electrical energy storage and regeneration means requires the presence of a first switching leg 100 connected between the positive line 10 and the negative line 11 of the DC power supply bus, in parallel with the bus capacitor Cb and downstream thereof. This first switching leg 100 comprises at least one first controlled electronic switch T1, such as, for example, a transistor of IGBT type, and, for example, a diode D1 connected in series with the electronic switch T1.

The aim of the invention is therefore to be able to use this common part consisting of this first switching leg 100 and to propose connecting thereto a first module M1 comprising a braking resistor Rf or a second module M2 comprising means for storing and regenerating the electrical energy generated during the braking of the electrical load. According to the invention, since the module M1, M2 is removable, the user can choose to employ a braking resistor Rf or means for storing and regenerating the electrical energy generated during the braking of the electrical load.

According to the invention, the variable-speed drive thus comprises a dedicated placement intended to connect the first module M1 or the second module M2 to the first switching leg 100. This placement comprises a first point of connection P1 to the positive line 10 of the DC power supply bus, a second point of connection P2 to the negative line 11 of the DC power supply bus, and a third point of connection P3 to the mid-point situated between the diode D1 and the electronic switch T1 of the first switching leg 100.

According to the invention, the first module M1 comprises a box or cassette enclosing a braking resistor Rf intended to dissipate the electrical energy generated during the braking of the electrical load.

When it is in place, the first module M1 connects to the third connection point P3 and to the first connection point P1 (in parallel with the diode D1).

According to the invention, the second module M2 comprises a box or cassette, preferentially of a form identical to the cassette of the first module, enclosing a second switching leg 200 and electrical energy storage means consisting of at least one supercapacitor UC. The second switching leg 200 comprises at least one second electronic switch T2, such as, for example, a transistor of IGBT type, and, for example, a diode D2 connected in series with the second electronic switch T2. The second module M2 also comprises an inductor L connected in series with the supercapacitor UC, the assembly consisting of this inductor L and the supercapacitor UC being connected in parallel with the diode D2 or with the second electronic switch T2 of the second switching leg 200. When the second module M2 is connected to the variable-speed drive 1, the connection mid-point P4 situated between the electronic switch T2 and the diode D2 of the second switching leg 200 is connected to the third connection point P3 and the second switching leg 200 is connected on the one hand to the first connection P1 and on the other hand to the second connection point P2. In this way, the diode D2 is connected in antiparallel with the first electronic switch T1 and the diode D1 is connected in antiparallel with the second electronic switch T2.

According to the invention, each module for example takes the form of an identical removable cassette intended to be connected to the variable-speed drive.

According to the invention, the variable-speed drive comprises control means making it possible to control each electronic switch T1, T2 employed, depending on whether the first module M1 or the second module M2 is connected.

When the second module is connected, the control means can be common to both of the switches T1, T2 employed. In this case, they will, for example, be located in the second module M2. As a variant, the control means may comprise a distinct control circuit for each switch T1, T2, the one dedicated to the switch T1 being situated in the variable-speed drive and the other dedicated to the switch T2 situated in the second module M2, the two circuits being then synchronized to control the two operating modes of the variable-speed drive.

When the second module is connected to the variable-speed drive, two operating modes are possible, controlled by employing the electronic switches T1, T2 of the first switching leg and of the second switching leg.

In a first operating mode, the electronic switch T1 is controlled in modulation (alternating opening and closure), for example by PWN, and the electronic switch T2 is controlled on opening so as to discharge the supercapacitor UC onto the DC power supply bus.

In a second operating mode, the electronic switch T1 is controlled on opening and the electronic switch T2 is controlled in modulation so as to transfer the excess energy generated during the braking to the supercapacitor UC.

To put the two abovementioned operating modes in place, the current Iuc and/or voltage Vuc values on the supercapacitor UC can obviously be measured or estimated.

Obviously, other variant embodiment can be envisaged, the principle remaining to be able to use one and the same switching leg and to add thereto a module provided with a braking resistor or means for storing and regenerating the electrical energy generated during the braking.

It is obvious that it will be possible, without departing from the framework of the invention, to devise other variants and refinements of detail and even envisage the use of equivalent means.

The invention claimed is:
1. A variable-speed drive comprising:
a DC power supply bus including a positive line and a negative line;
a bus capacitor connected between the positive line and the negative line of the DC power supply bus;
an inverter module powered by the DC power supply bus and controlled to deliver a variable voltage to an electrical load;
a first switching leg connected between the positive line and the negative line of the bus and comprising at least one first electronic switch;

a first module comprising a braking resistor or a second module comprising means for storing and regenerating electrical energy generated during braking of the electrical load;

wherein the first module and the second module are removable and interchangeable;

wherein the first module and the second module take a form of a cassette that connects to the DC power supply bus and to the first switching leg.

2. The variable-speed drive as claimed in claim 1, wherein the first switching leg comprises a diode mounted in series with the first electronic switch and defining between them a connection mid-point.

3. The variable-speed drive as claimed in claim 2, wherein the second module comprises a second switching leg and one or more supercapacitors.

4. The variable-speed drive as claimed in claim 3, wherein the second switching leg is connected in parallel with the first switching leg.

5. The variable-speed drive as claimed in claim 4, wherein the second switching leg comprises a second electronic switch and a diode connected in series and defining a connection mid-point connected to the connection mid-point of the first switching leg, the diode of the second switching leg being connected in antiparallel with the first electronic switch and the diode of the first switching leg being connected in antiparallel with the second electronic switch.

6. The variable-speed drive as claimed in claim 4, wherein the second module comprises an inductor connected in series with the supercapacitor.

7. The variable-speed drive as claimed in claim 2, wherein the braking resistor of the first module is connected in parallel with the diode of the first switching leg.

8. The variable-speed drive as claimed in claim 1, further comprising control means configured to operate differently depending on whether the first module or the second module is connected.

* * * * *